J. Waterhouse.
Wool Burring.

№ 18,564.   Patented Nov. 3, 1857.

UNITED STATES PATENT OFFICE.

JOHN WATERHOUSE, OF LITTLE FALLS, NEW YORK.

MACHINERY FOR BURRING WOOL ON THE PELT.

Specification of Letters Patent No. 18,564, dated November 3, 1857.

*To all whom it may concern:*

Be it known that I, JOHN WATERHOUSE, of Little Falls, in the county of Herkimer and State of New York, have invented a new and useful Improved Machine for the Purpose of Removing from Wool while on the Pelt Burs and other Extraneous Substances; and I do hereby declare the following to be a full, clear, and exact description of the same, reference being had to the accompanying drawings, making part of the same.

Figure 1:
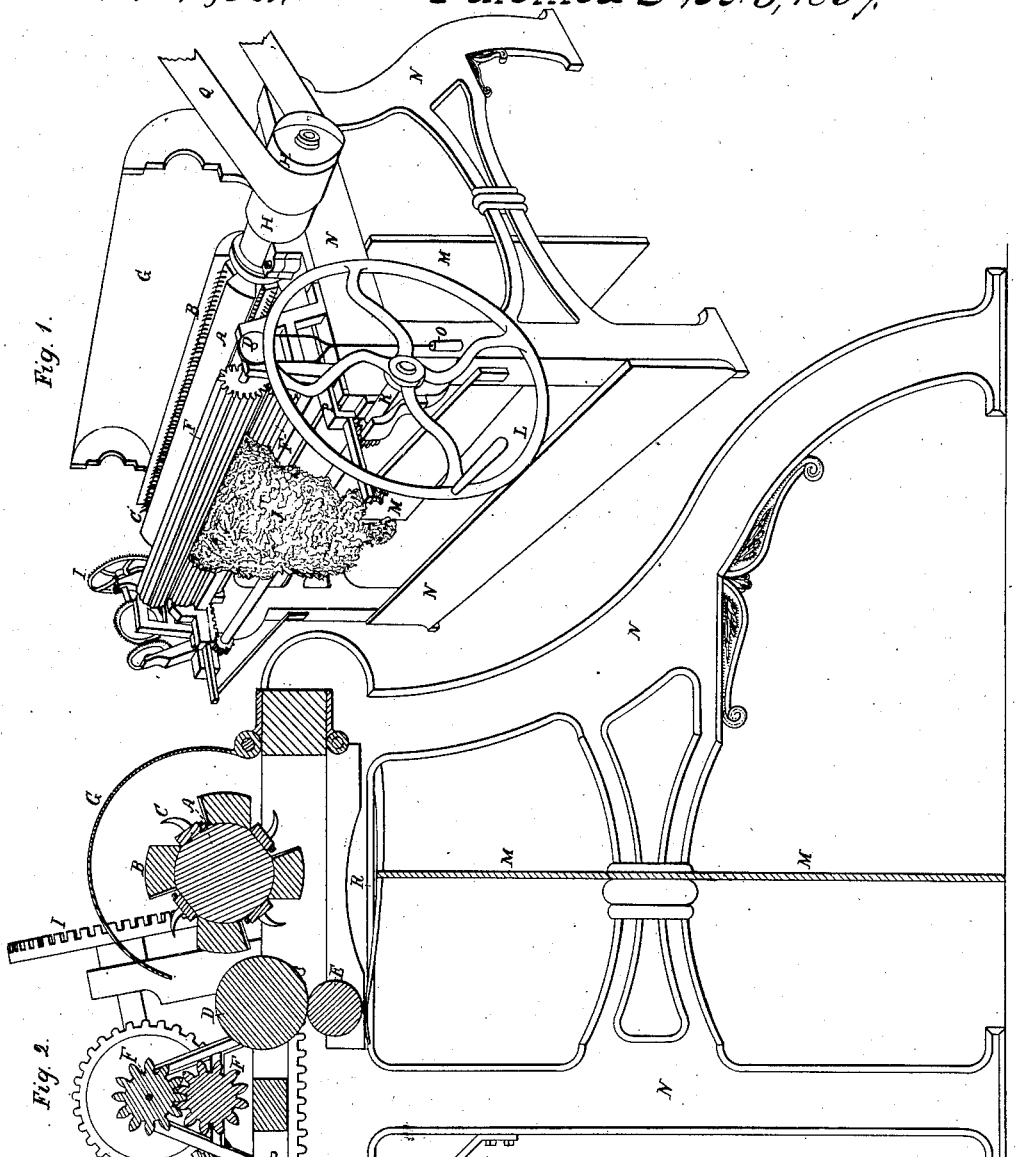
Figure 2:
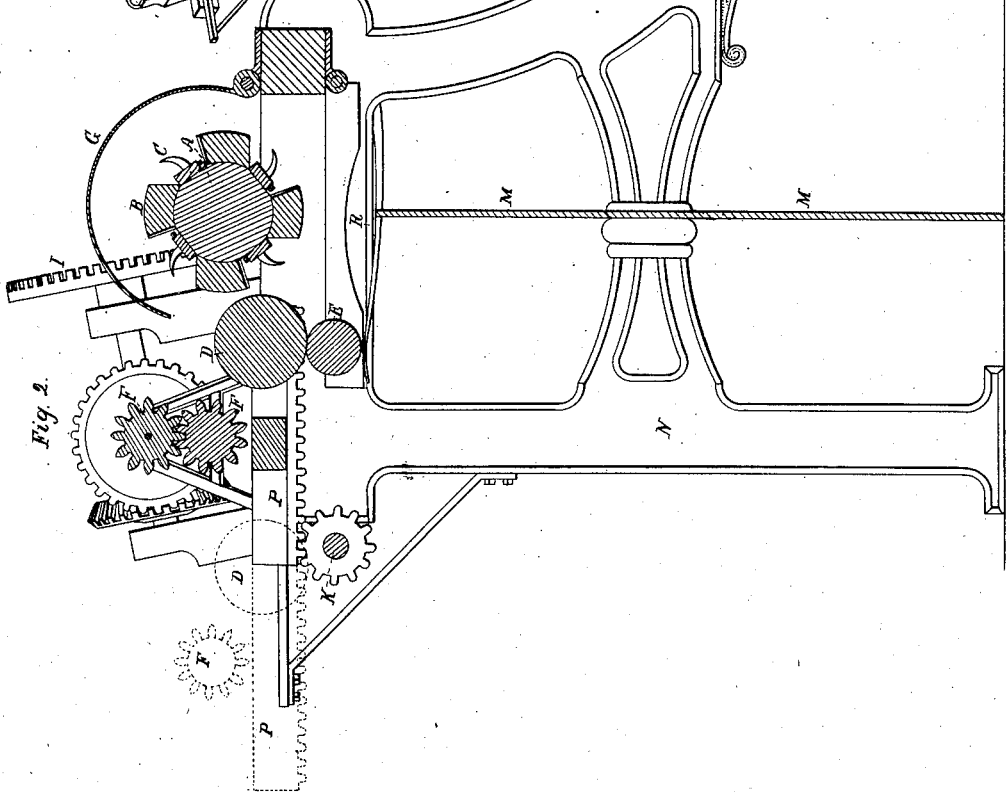

Figure 1 is a perspective view of the machine. Fig. 2 is a sectional cross view of the machine.

Similar letters in the several figures represent like parts.

The nature of my invention relates to a machine for burring and cleaning wool in the pelts, by clamping said pelts between feeding rollers, and presenting them, thus held by the feed rollers, to the action of a revolving cylinder, armed with teeth and beaters, so arranged as to comb or straighten out the fiber, while the beaters knock off the burs and other extraneous matter. The pelt being held so as to prevent all danger of being drawn into, torn, or injured by the cylinder.

It is a fact well known to those in the trade, that the wool on pelts as they are found in the market, both of home and foreign growth, are not unfrequently so thickly matted with burs and other substances, that many of them are from that cause nearly worthless, or at least to remove the burs and other substances from them by any of the modes hitherto known, costs nearly as much as the wool would be worth when thoroughly freed of such extraneous substances. It is also known to those in the trade, that wool is grown in the South American States, and that from those States or countries, large amounts of pelts are annually shipped to other countries; hitherto but few have found purchasers in the United States, from the fact that there has not been any method of thoroughly removing the burs with which they are thickly matted, except by hand; hence they have been carried to countries where cheap hand labor can be obtained to remove them.

My machine, although primarily adapted to the removing of burs and other substances from wool when on the pelts, may be applied to the removing of any extraneous substances contained in hair or fur when on the pelts or skins.

I am aware that machines for cleaning wool while on the pelts have been constructed, and that cylinders have been arranged with bars or beaters to be used without teeth, and also bars or beaters arranged with teeth on their periphery. I am aware that teeth and bars have been arranged separately but used in combination upon the same cylinder as I use them, which arrangement I regard as essential to the practical and successful use of a machine for the purpose of cleaning wool on the pelt. I therefore do not mean to claim the cylinder I am about to describe substantively. I am also aware that machines have been constructed for like purposes wherein the material to be acted upon was presented to the action of the teeth, or bars, by being stretched upon flat surfaces, but have found that such presentation by practical use, is not successful, as the pelts will be drawn into and around the cylinder and thereby torn into pieces.

To enable others skilled in the art, to make and use my invention, I will proceed to describe the same with reference to the drawings.

In the construction of my machine, the frame N, N, may be made of wood or metal, (but the latter is the best,) upon which all parts of the machine are constructed. The cylinder A, A, should be made of metal of any length desired for the particular kind of work to be done, and of such diameter that would be from point to point of teeth for four bars and four sets of teeth, about eight inches, and a proportionate increased diameter for any additional bars or teeth. The speed of an eight inch cylinder should be from eight to twelve hundred revolutions per minute. The cylinder may be driven as shown at H, H, and Q, by bands and pulleys, or any other motive power. The bars B, B, may be placed either before or after the teeth C, C; they may be made of wood or metal, firmly bolted to the cylinder and faced with metal, and should extend slightly beyond the periphery of the teeth. The teeth C, C, are made crooked or hook-shaped, and firmly fastened into bars, which are bolted upon the cylinder, and also may be confined by rings to insure their attachment to the same. They may also be made adjustable to adapt them to fiber of different lengths. Or the beaters may be made adjustable, which would attain the same object. The cylinder must be well balanced and made perfectly true. The teeth should not be placed immediately behind each other, but arranged around the cylinder so that they would not follow in each other's track. This combination of bars and teeth upon the same cylinder in their action upon the material to be operated upon, produces results not hitherto attained by any known process. While the teeth comb and open the fiber, and at the same time separate from it any substance to be removed, the bars or beaters remove the substance thus separated and smooth down by their action the fibers together, and thereby presenting the fibers in a proper condition to be opened or separated again. This combination of bars or beaters with teeth upon the same cylinder, also prevents the material from being drawn into and around the cylinder by too rank a hold of the teeth.

G, G, is a hinged case or cap, so arranged as to cover, when in operation, the cylinder, and to direct the substances removed beneath the machine. If desired, water may be discharged beneath the cover upon the cylinder, or water may be brought in contact with the cylinder in any other manner for the purpose of cleaning it and discharging upon the material being acted upon, and upon that which is removed, and discharged beneath the machine.

The presenting roller D, may be made of wood or metal, or of an elastic substance, depending upon the purpose for which the machine is used. It may be from four to five inches in diameter, and is operated by the material drawn over it by the grooved rollers—this roller is mounted upon the reciprocating carriage, and moved back and forth by the same. The elastic roller E, is attached to the main frame and rests in elastic bearings, which are acted upon by the springs R, R, or there may be weighted levers in the place of the springs. This roller seizes the material as the reciprocating carriage is moved forward to be acted upon, and confines it in close contact with the presenting roller D. The lower grooved roller F, has its bearings in boxes resting upon the reciprocating carriage, and should be deeply grooved and made of metal, and should be from three to four inches in diameter; this roller, together with the presenting roller, are moved back and forth by the workman, by the hand wheel L, operating the pinion shaft K, K, which works the pinions into the racks P, P, when back the workman places the material J, to be operated on over the lower grooved roller F, and the presenting roller D, the carriage is then moved forward to its proper position (regulated by a stop or guard which may be adjustable) to have the material acted upon, and at the same time the material is brought in contact with, and is clamped by the upper grooved elastic roller F, (which is supported by stands upon the main frame, in which elastic bearings are placed,) and is rotated by the worm gear I, and is held down by the springs O. The dividing board M, M, separates the substance removed, the least foul being discharged back of it, while that which is more foul is deposited in front of it. I have described one of each of the pairs of rolls as elastic, and the other as non-elastic. I do not mean to confine myself especially to either one of the pairs or sets being so made, the object being to feed, hold and control the pelt between a yielding and a non-yielding surface, so that it may be properly presented and at the same time held away from the cylinder, to prevent its being caught or wound on the cylinder.

In the practical operation of my improved machine in removing from wool on pelts, burs and other substances, but a very small portion of the good fibers are removed, but that which is injured and worthlesss from any cause, is entirely separated, and I also find (the pelts having first been soaked in warm water) that after having been passed through the machine the yolk and other foul substances contained in the wool, is much more effectually removed by washing, than could be done without being first acted upon by the machine, and in fact I have found the machine of great utility in treating pelts with it, when it would not be necessary to pass them through the machine for removing burs simply—it leaves the wool in a much better condition for spinning or felting than can possibly be attained by any other known process.

Having thus fully described my invention, what I claim therein as new, and desire to secure by Letters Patent is,

1. The combination of the feeding apparatus, which holds and controls the pelt, with a cleaning cylinder arranged, constructed, and operating, substantially, as herein set forth.

2. I claim the combination of the rollers D, E, one being elastic and the other non-elastic, for holding and presenting the pelt in a curved or bent form, to the action of the cleaning cylinder, substantially as described.

3. I claim in combination with the holding and presenting rollers, the feeding rollers F, F, one of said rollers F, being elastic and the other non-elastic, substantially as described and for the purpose set forth.

4. I claim mounting one of the feed rolls, F, and one of the holding and presenting rolls, on the main frame, and their fellows upon a traveling carriage, for the purpose of facilitating the introduction, turning, and removal of the pelt, substantially as herein set forth.

JOHN WATERHOUSE.

Witnesses:
 GEO. W. BEARDSLEE,
 GEO. ASHLEY.